United States Patent [19]

Crutchfield

[11] 4,241,713
[45] Dec. 30, 1980

[54] ROTARY INTERNAL COMBUSTION ENGINE

[76] Inventor: Melvin R. Crutchfield, 3804 N. 54th Pl., Phoenix, Ariz. 85013

[21] Appl. No.: 923,077

[22] Filed: Jul. 10, 1978

[51] Int. Cl.³ .............................................. F02B 53/00
[52] U.S. Cl. .................................... 123/202; 123/243; 418/138; 418/159
[58] Field of Search ................ 123/202, 243; 418/137, 418/138, 159, 241, 253

[56] References Cited

U.S. PATENT DOCUMENTS

| | | | |
|---|---|---|---|
| 1,427,692 | 8/1922 | Mahon et al. | 123/243 X |
| 2,070,138 | 2/1937 | Martin | 123/243 X |
| 2,991,930 | 7/1961 | Lindner | 418/159 |
| 3,637,332 | 1/1972 | McAnally | 123/243 X |
| 3,747,573 | 7/1973 | Foster | 123/243 X |

FOREIGN PATENT DOCUMENTS 140501 2/1935 Austria .................................... 123/202
313195 6/1929 United Kingdom .................... 418/138

Primary Examiner—Michael Koczo
Attorney, Agent, or Firm—Gregory J. Nelson

[57] ABSTRACT

A rotary internal combustion engine having a housing defining a chamber is disclosed. A fixed shaft extends coaxially through the chamber. A plurality of vanes are pinned to a collar which is rotative about the shaft. One vane is rigidly secured to the collar. A cylindrical drum is positioned in the working chamber with the centerline of the drum radially offset from the centerline of the working chamber. The vanes extend through slots or apertures in the rotor to close proximity with the chamber wall. A fuel delivery system communicates with the chamber through approximately 90 degrees of the compression cycle. An exhaust opening communicates with the chamber at the end of the expansion cycle whereby the compression ratio is substantially less than the expansion ratio. In one embodiment means are provided to vary the compression and expansion ratios.

6 Claims, 10 Drawing Figures

ROTARY INTERNAL COMBUSTION ENGINE

The present invention relates to a rotary internal combustion engine of improved thermal efficiency of the rotary vane type in which the vanes rotate about a central shaft, the center line of which is colinear with the axial center line of an outer housing or casing.

Rotary apparatus or mechanisms, such as vane compressors, vane hot gas or steam engines, and vane internal combustion engines, are well known in the prior art. As an internal combustion engine, the rotary device theoretically provides certain advantages over conventional reciprocating engines. Rotary engines are generally mechanically less complex than reciprocating engines which have normally more component parts. Rotary engines have been proposed which employ a plurality of sliding vanes for separating combustion areas or chambers between outer and inner rotors. The vanes extend outwardly from a rotor and engage a cyclindrical bore in the housing and are eccentrically mounted with respect to the bore. The vanes are arranged with respect to a fuel system so that the vanes in their outward movement draw in the combustible mixture and in their inward movement subject the mixture to primary compression. This sliding vane type of motor is typified in U.S. Pat. No. 3,548,790.

Other approaches to the problem have been to eliminate the sliding vanes. U.S. Pat. No. 3,747,573 shows a rotary vane device in which the vanes are pinned to a central hub shaft and includes a separate circular drum to assist to transmit torque through the vanes and guide the radial direction of the vanes. The vanes are pinned at their center of gravity to the central hub shaft so that they can oscillate back and forth as the central hub shaft rotates. Synchronizing means, such as a gear train, causes the hub and drum to rotate in the same direction at the same speed.

Still another approach to the problem of providing an efficient rotary design is shown in U.S. Pat. No. 3,866,909 which includes an outer rotor and a smaller inner rotor which has an axis which is offset with respect to the axis of the outer rotor. The inner rotor is provided with a plurality of vanes extending through slots in the rotor and in sliding contact with the inside wall of the outer rotor. The rotor is rotated at different speeds. The vanes which define combustion areas or chambers therebetween, are pivoted about an axis coaxial with the axis of the outer rotor.

The prior art typified by the devices described above, exhibit certain deficiencies. Many devices necessarily include synchronizing means which are mechanically inefficient and add to the complexity of the device. Other devices, exhibit a major deficiency in that the sliding vane exerts substantial drag against the outer casing. Other rotary engine designs are thermodynamically inefficient.

Briefly, in accordance with the present invention, an internal combustion engine is disclosed which eliminates many of the major deficiencies of the conventional rotary devices. The engine of the present invention operates on a heat cycle characterized by isentropic compression, constant volume combustion, isentropic expansion and a constant pressure exhaust. One of the significant differences is that the volumetric compression ratio is substantially less than the volumetric expansion ratio. In accordance with the present invention, a housing defines a cylindrical working chamber. A fixed or stationary central shaft extends through a cylindrical housing and is coaxial with the center line of the working chamber. A plurality of vanes are pinned or pivotally attached to a mounting collar which is rotative about the central shaft. One vane is rigidly secured to the collar. A cylindrical drum is arranged within the working chamber with the center line of the drum radially offset from the center line of the working chamber. An output shaft is mounted in bearings in the housing and is connected to the drum. The radially extending vanes extend through axial slots in the rotor with appropriate bearings provided at the intersection with the vane surfaces. The tips of the vanes extend to close proximity with the wall of the working chamber effectively dividing the space into combustion areas, exhaust areas, compression and expansion areas. The tip of each of the vanes rides in close proximity to the inner walls of the chamber to prevent gas from leaking between the adjacent spaces. A fuel delivery system communicates with the chamber through approximately 90 degrees of the compression part of the cycle. Fuel may be directly injected or mixed with air and blown into the chamber. The mixture is compressed by rotational displacement of the rotor and vanes. Following admission of fuel and compression, the compressed mixture is ignited and expands into the expansion portion of the cycle imparting rotational displacement to the rotors and vanes and output shaft. An exhaust opening communicates with the chamber at the end of the expansion cycle which is approximately 180 degrees displaced from top dead center. A blower, either positive displacement or centrifugal, is utilized to sweep or scavenge the spent gases at the end of the expansion and to provide a fresh supply of oxygen to burn the succeeding fuel charges. The blower will discharge directly into an opening in the housing for an interval of approximately 90 degrees rotation between the end of the expansion cycle and the beginning of compression. The openings are provided in the end walls of the casings so the scavenging is into the machine radially and out of the end holes along the vanes.

The above and other objects and advantages of the present invention will be more fully understood from the following description, claims and drawings in which:

Figure 1:
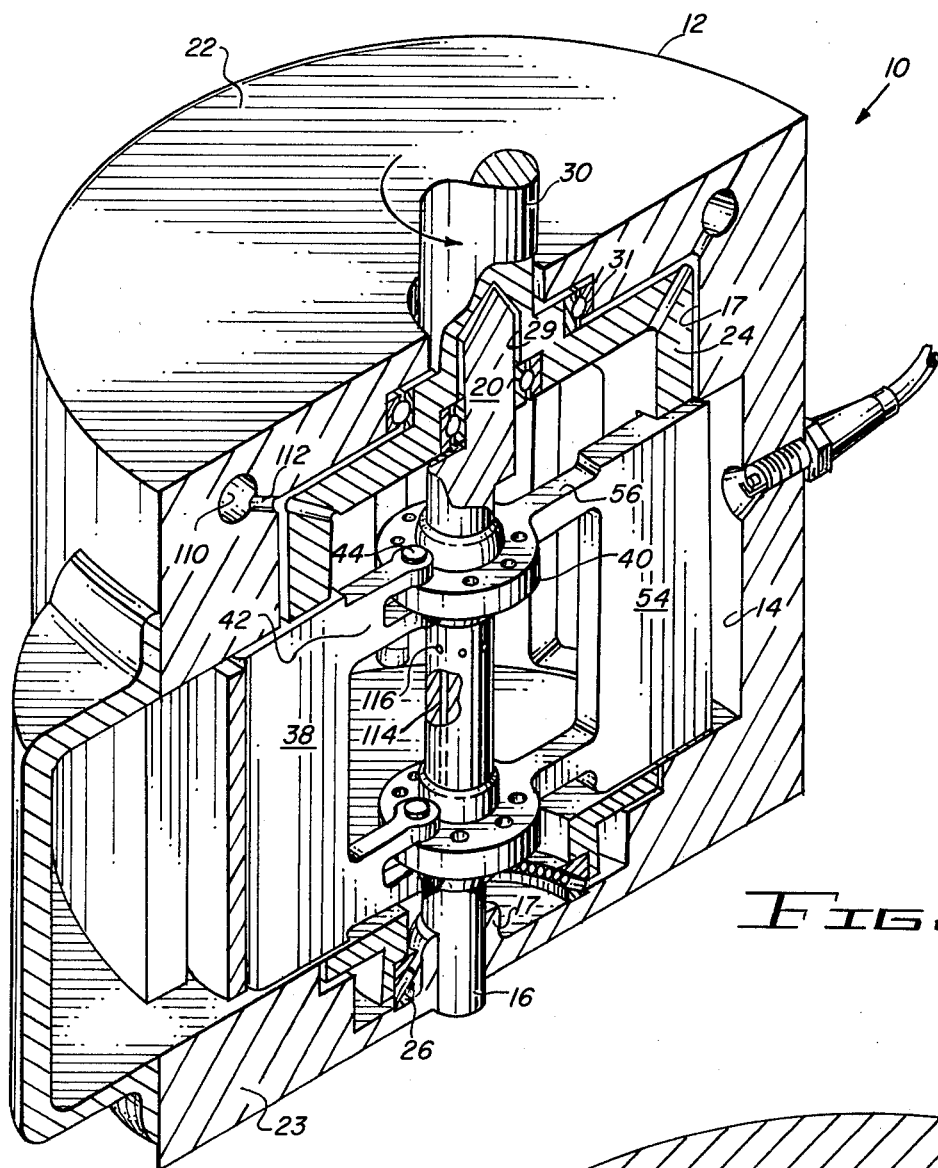
FIG. 1 is a perspective view of the engine of the present invention sectioned to better illustrate the working components.

Referring now to the drawings, which illustrate the preferred embodiments of the present invention, the rotary internal combustion engine of the present invention is generally designated by the numeral 10. Engine 10 includes a cylindrical housing 12 and opposite plates 22 and 23 fabricated from a suitable material such as a high alloy heat-treated steel as for example ASTM 4360. Housing 12 defines a generally cylindrical working chamber 41 which is machined or otherwise accurately dimensioned. A stationary vane shaft 16 has its axial center line concentric with the center line of working chamber 14 and one end is fixed in the housing at hub 17. The opposite end of shaft 16 is provided with an eccentric stub shaft portion 20 which is received within bore 29 in output shaft 30. The axial center line of stub shaft 20 is radially offset from the axial center line of the main portion of shaft 16.

A generally cylindrical drum 24 is rotatably mounted in bearings 26 and 31. Bearings 35 are interposed between shaft 20 and bore 29. Drum 24 is concentric with respect to the axial center line of stub shaft portion 20 and eccentric with respect to cylinder chamber 14 having a portion received within cylindrical chamber 17 of end plate 22. Output shaft 30 extends through end wall 22 of housing 12. Output shaft 30 is driven by rotor 24.

Rotor 24 defines a plurality of axial apertures or slots 36 which are circumferentially spaced-apart. A plurality of generally rectangular vanes 38 extend through slots 36 to close with the periphery of the enlarged section working chamber 14. The number of hinged vanes 38 is one less than the number of slots 36. Hinged vanes 38 are secured to shaft 16 at one or more annular collars 40, two being shown. A pair of mounting arms 42 are disposed at opposite sides of collar 40 and are pivotally secured or hinged to the collar by pivot pins 44.

One vane 54 is rigidly secured to the annular collar members 40 at axially spaced apart legs 56. The vanes may be fabricated from any suitable material such as heat-treated stainless steel.

Figures 2, 3:
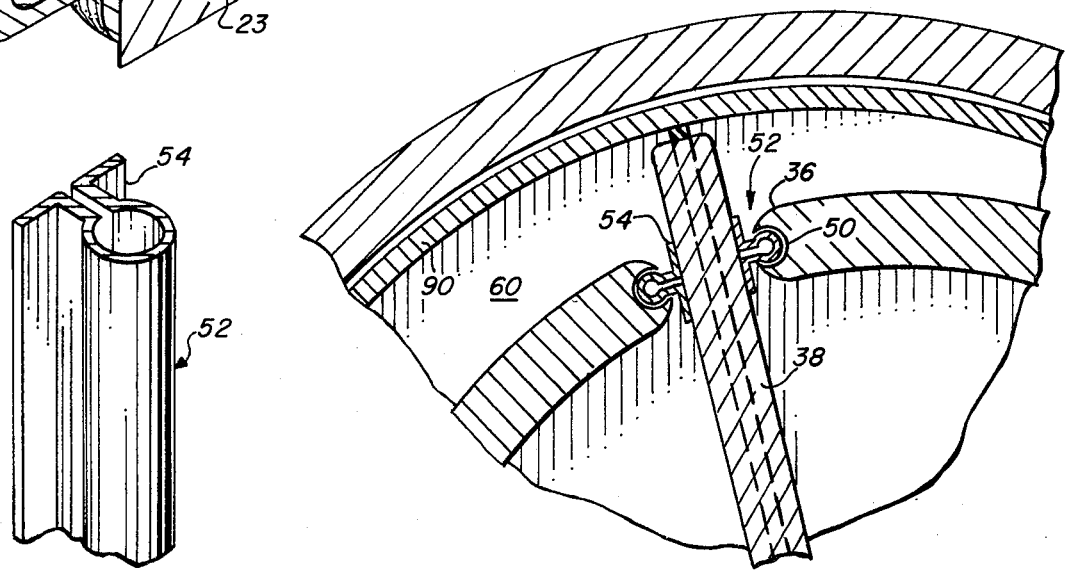
FIG. 2 is a detailed view of one form of the vane seal.
FIG. 3 is a perspective view of the vane seal.

As best seen in FIG. 2, bearing surfaces are provided at slots 36 to accommodate the oscillatory movement of the vanes during the rotational cycle. As shown in FIG. 2, the opposite sides of slots 36 is provided with a semicircular axially extending groove 50 which receives the bearing member 52 having bearing surfaces 54 engaging the opposite planar surface of the vanes. Bearing member 52 may be formed from a suitable material such as stainless steel, or other wear-resistant material. The configuration of the bearing member shown in FIGS. 2 and 3, permits the bearing member to be removed and replaced if necessary and permits bearing member 52 to rotate with groove 50 to accommodate the angular displacement of the vanes as the vanes rotate.

Adjacent vanes, the section of the rotor extending between the adjacent vanes and the working chamber form a series of individual pressure chambers 60. It will be obvious that the pressure chambers occupy maximum volume at approximately bottom dead center (BDC), as indicated in FIG. 5 and minimum volume at approximately top dead center (TDC), as shown in FIG. 5.

A plurality of openings 62 are provided in the housing 12 in the region extending approximately from bottom dead center throughout approximately 90 degrees but varying depending on the compression ratio desired and other mechanical relationships towards top dead center. This portion of the cycle is generally indicated as the intake portion of the cycle. A manifold 64 encloses the intake openings 62. Preferably, intake openings 62 extend substantially the full axial length of the vanes. Air containing oxygen to support combustion is provided to the intake manifold 64 by a blower of either the positive displacement type or centrifugal type, 65. The blower discharges directly into the spaces between the vanes through the openings 62 in the housing for an interval of approximately 90 degrees rotation between the end of expansion at bottom dead center (BDC) and the beginning of compression. Spend gases are discharged through end holes 80 and via manifolds 81 to exhaust system. Check valves 61, shown as reed valves, may be placed in the end walls toward the end of the expansion section to permit admission of ambient air in the event expansion to a negative pressure occurs in this region.

The fuel system may be either a carburetor or a direct injection system. A carburetion system would provide a continual, approximately chemically correct fuel/air mixture. This mixture will serve the purpose of purging exhaust gases and providing a fresh charge. The fuel can be mixed with the incoming air in the intake manifold by any appropriate carburetion device of conventional design. Depending on the type of blower used and velocity, it may be necessary to incorporate a control to prevent excess fuel from being discharged into the exhaust system during transients.

Figure 5:
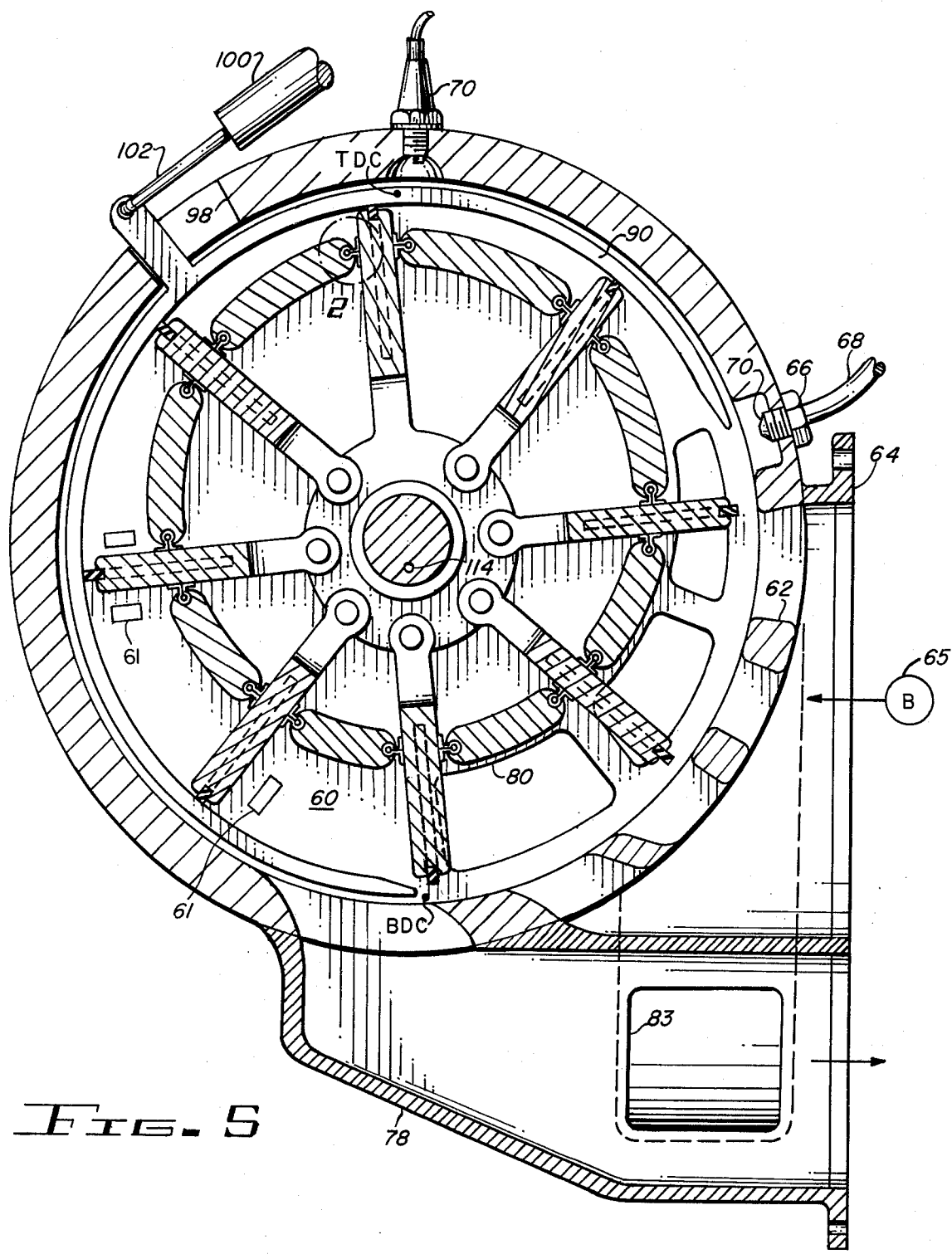
FIG. 5 is a vertical cross-section view of the engine of the present invention.
Figure 6:
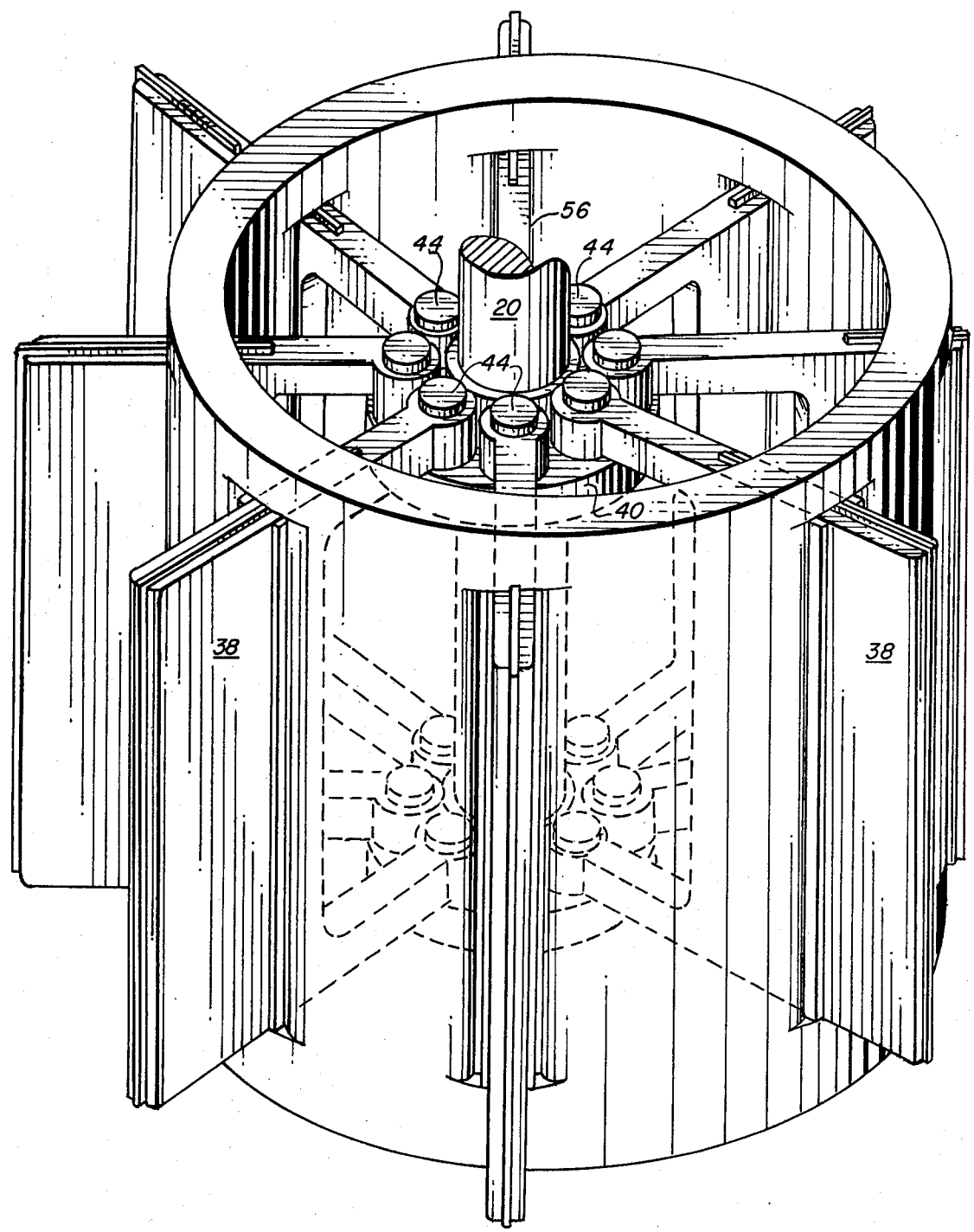
FIG. 6 is a perspective view of the inner rotor and vane assembly.

Direct injection of fuel into the cycle at the beginning of compression is shown in FIG. 5. A fuel charge is injected to the charge being compressed by injector 66. The injector is removably secured in the housing above the intake manifold. Fuel injector 66 may be of conventional type is well known in the art, connected to a suitable fuel source by line 68. Fuel injector 66 provides a band of fuel/air mixture into the vicinity of the ignition device 70. Ignition device 70 may be any conventional type if ignition device but is shown as a sparkplug for firing the combustible mixture in the pressure chambers at approximately top dead center (TDC). The width of the band of fuel/air will vary with the load covering essentially the entire pressure chamber 60 at full load.

A low-pressure pump, not shown, will be necessary to provide fuel at a preselected pressure to the nozzle 70 which atomizes the fuel. The nozzle may be a mechanical atomizer or may be an atomizer using a small amount of air extracted from the engine during the compression process. Suitable controls to allow fuel metering with load and to limit fuel flow with speed may be necessary in this system. Direct injection provides certain advantages primarily in the purging system as any carry-over of fuel into the exhaust via the purging duct 81 is avoided.

Subsequent to ignition, expansion occurs substantially from top dead to nearly bottom dead center. In the area at approximately bottom dead center, one or more axially extending port 76 are provided in the housing and communicate with the interior of exhaust manifold 78.

A plurality of aperture openings 80 are also provided in the end plates 32 of the housing. The apertures 80 extend substantially through the intake region of the cycle. A purging or scavenging manifold 81 encloses the apertures at each of the end plates 22. The discharge end of the manifolds 81 are shown connected to the exhaust manifold 78 at inlet opening 83 so gases purged from the chambers 60 are transferred to the exhaust.

Lubrication of the bearings and other moving parts of the engine of the present invention can be accomplished by an oil gallery 110 having passages 112 lubricating the components of the machine. Similarly, an oil passage 114 can be provided axially in shaft, discharging at ports 116 to the interior of the rotor 24. An appropriate oil system will include an oil pump and a cooler for recirculating the lubricating fluid which for simplicity is not shown.

Figure 10:
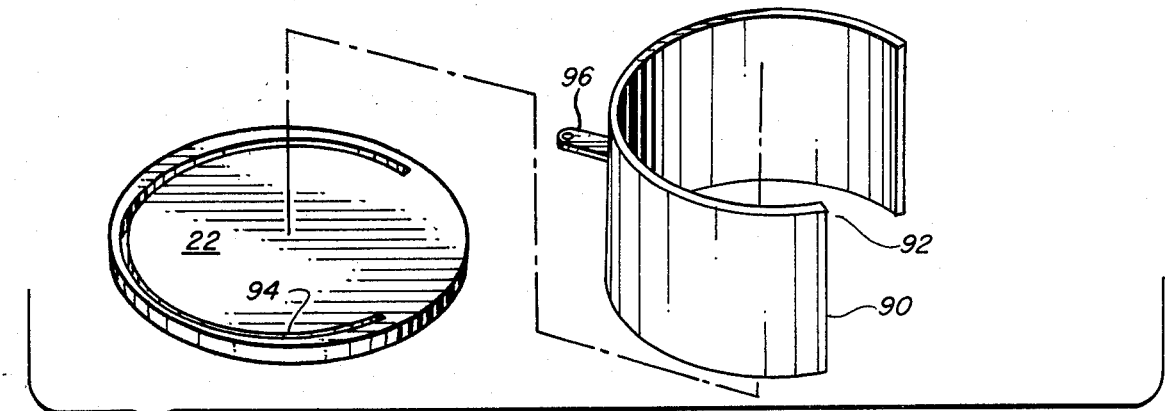
FIG. 10 is an exploded view of the liner and end plate.
Figure 4:
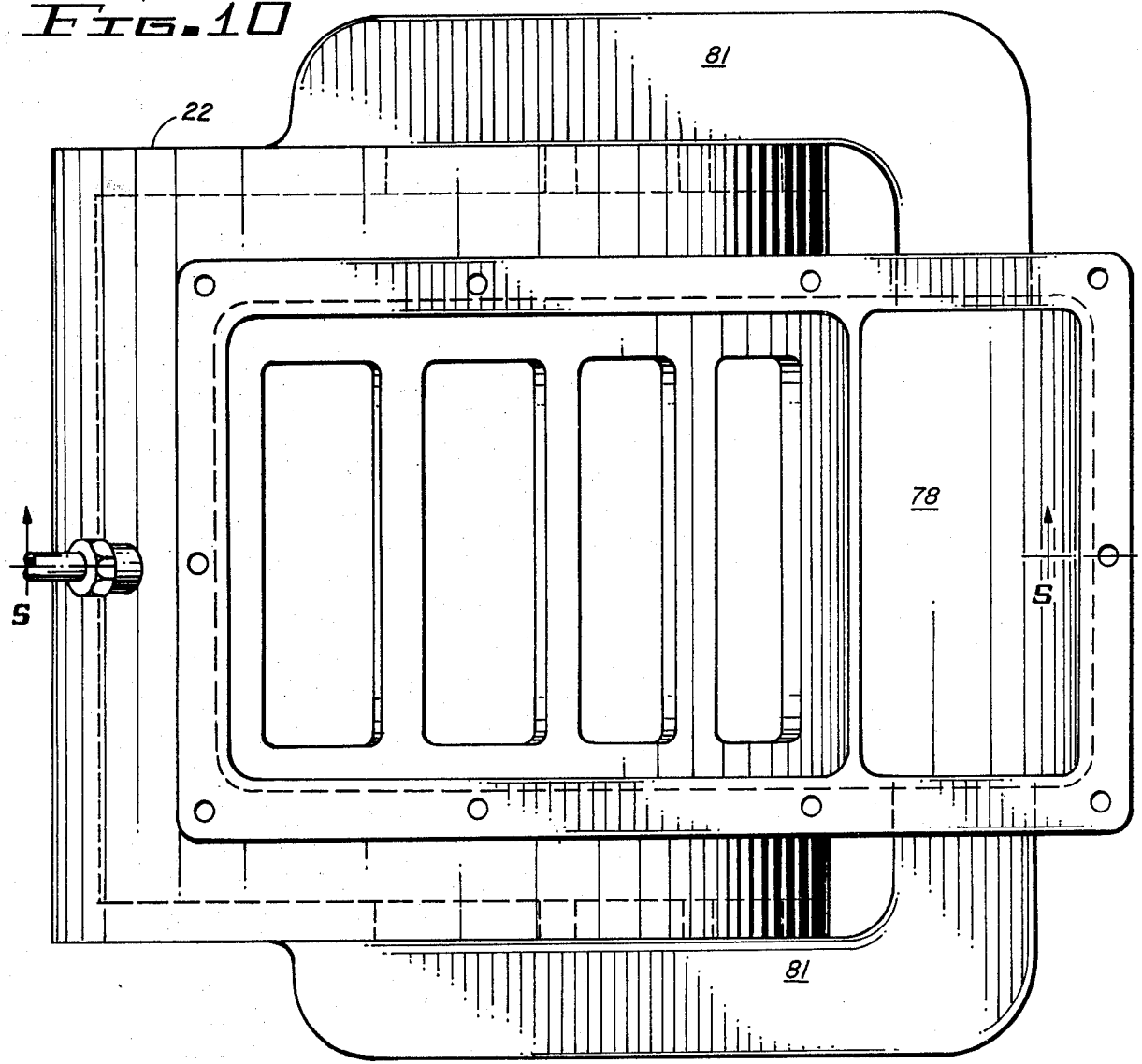
FIG. 4 is a plan view of the engine of the present invention illustrating the exhaust, intake and scavenging ports.

FIGS. 5 and 10 illustrate means for varying the compression ratio of the engine. This is accomplished by insertion of a generally C-shaped cylindrical liner 90 within chamber 17. Liner 90 defines an axial opening 92 which is positioned to align with the intake region. The opposite ends of the liner are slidably received within arcuate slots 92 in opposite end plates 22. Actuating arm 96 projects through and opening 98 in housing 12 and is operated by hydraulic cylinder 100 through rod 102. Cylinder 100 can be controlled by an appropriate valve, not shown, which can automatically respond to variations in exhaust pressure or other selected control parameters.

As viewed in FIG. 5, if sleeve or liner 90 is rotated clockwise, the compression ratio is increased and the expansion ratio decreased. Conversely, counterclockwise rotation of sleeve 90 will decrease the compression ratio and increase the expansion ratio.

The present invention will be more fully understood from the following description of operation: As an engine, the machine functions similar to engines operating on the Otto cycle; that is, a spark ignition engine burning a chemically correct or nearly correct fuel/air mixture. Two important variations exist, however. The compression ratio is considerably less than expansion ratio and fuel is injected directly into the air at the start of compression. Thus, load is controlled not by throttling as in the Otto engine but by fuel flow as in diesels.

Tracing the cycle from beginning to end, air is introduced into the pressure chambers 60 through the intake manifold 64 and intake openings 62. The air is confined in the pressure chambers 60 defined by adjacent vanes, the rotor section extending between adjacent vanes and the housing wall 17. At the same time, a fuel charge continuously introduced into the chambers as, for example, by carburetion device, or by fuel injection device 66, as shown to provide a band of fuel/air in the vicinity of the ignition device 70.

Combustion occurs at approximately TDC and is initiated by ignition device 70 which fires the charge. Combustion occurs at essentially constant volume. Expansion then occurs for approximately 180 degrees through the expansion regime from TDC to BDC. At the point where the volume between the vanes is at a maximum, exhaust port 76 communicates with the pressure chamber 60 to permit discharge of spent gases. As the working volume in the pressure chambers continues to rotate towards the start of compression, past bottom dead center, the remaining exhaust gases are swept or scavenged from the pressure chambers through exhaust apertures at ports 80 to the exhaust manifold via duct 81. A fresh supply of air containing oxygen to support combustion is provided to the pressure chambers to burn the next charge.

The following will assist in an understanding of the advantages derived from the engine of the present invention. The net work available from a heat cycle is equal to the work of expansion minus the work of compression. Therefore, if the work of expansion is increased or the work of compression is decreased, the net work of the cycle is increased and the overall efficiency increase provided the change in work was not gained with the sacrifice of fuel. The work of expansion can be calculated from the expression:

$$Q = W C_p T$$

for isentropic or reversible adiabatic processes. Where Q equals work in BTU/lb, W equals one pound working fluid (product of combustion), $C_p$ equals specific heat at constant pressure, $\Delta T$ equals the temperature at the start of expansion minus temperature at the end of expansion in degrees Rankine. Thus T can be calculated from the expression:

$$T_4 = T_3 \left( \frac{P_4}{P_3} \right)^{\frac{k-1}{k}}$$

where:
k equals ratio of specific heat
$P_3$ equals pressure at the beginning of expansion (Psia)
$T_3$ is either known or can be calculated from gas law theory.

Thus, the ideal and actual work available in the expansion process is a function of the temperature at the end of combustion (start of expansion) and the pressure ratio through which expansion proceeds. In conventional reciprocating engines, the expansion pressure ratio is a function of the volumetric compression ratio (compression ratio as commonly used in a volumetric relationship and for isentropic processes, $$\left( \frac{V1}{V2} \right)^k = \frac{P2}{P1}$$

Figure 7:
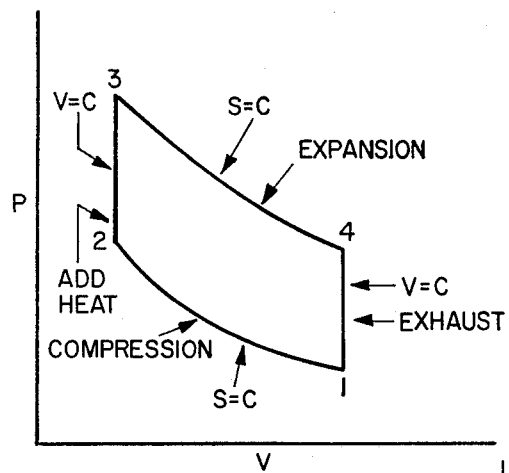
FIG. 7 is a P-V diagram illustrating a typical Otto cycle operation.

FIG. 7 is a P-V diagram illustrating a typical Otto cycle engine.

Pressure or volumetric ratios in conventional reciprocating engines are the same for compression and expansion, therefore, the work available is a function of the compression ratio. The greater the compression ratio and hence the expansion ratio, the greater the amount of work which can be extracted from a working fluid at a given initial temperature and pressure.

FIG. 7 represents the P-V diagram for a conventional Otto cycle engine as described above.

Considering the compression and combustion portions of the cycle, some improvement can be achieved by reducing the work of compression.

The work of compression, like the work of expansion, is a function of compression ratio. If a low pressure ratio for compression can be accomplished while maintaining a high expansion ratio, the net work of the cycle will be increased and the cycle efficiency will improve. Such a relationship between compression and expansion is possible only in an engine having a constant volume combustion process. In a constant volume process, $(P_2/P_1) = (T_2/T_1)$ (Charles' Law) and, therefore, as fuel burns, pressure rises in the same ratio as the absolute temperature changes.

Figure 8:
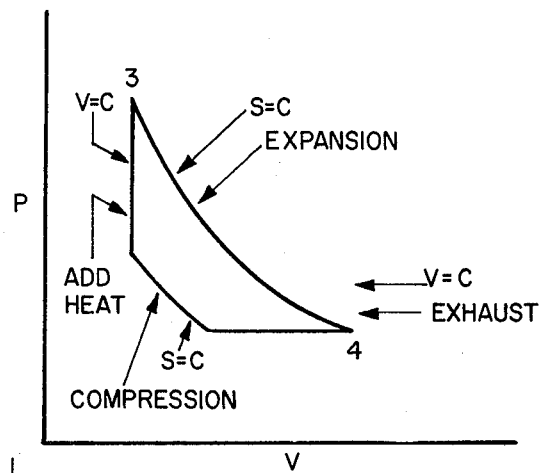
FIG. 8 is a P-V diagram showing the thermodynamic cycle of the engine of the present invention.
Figure 9:
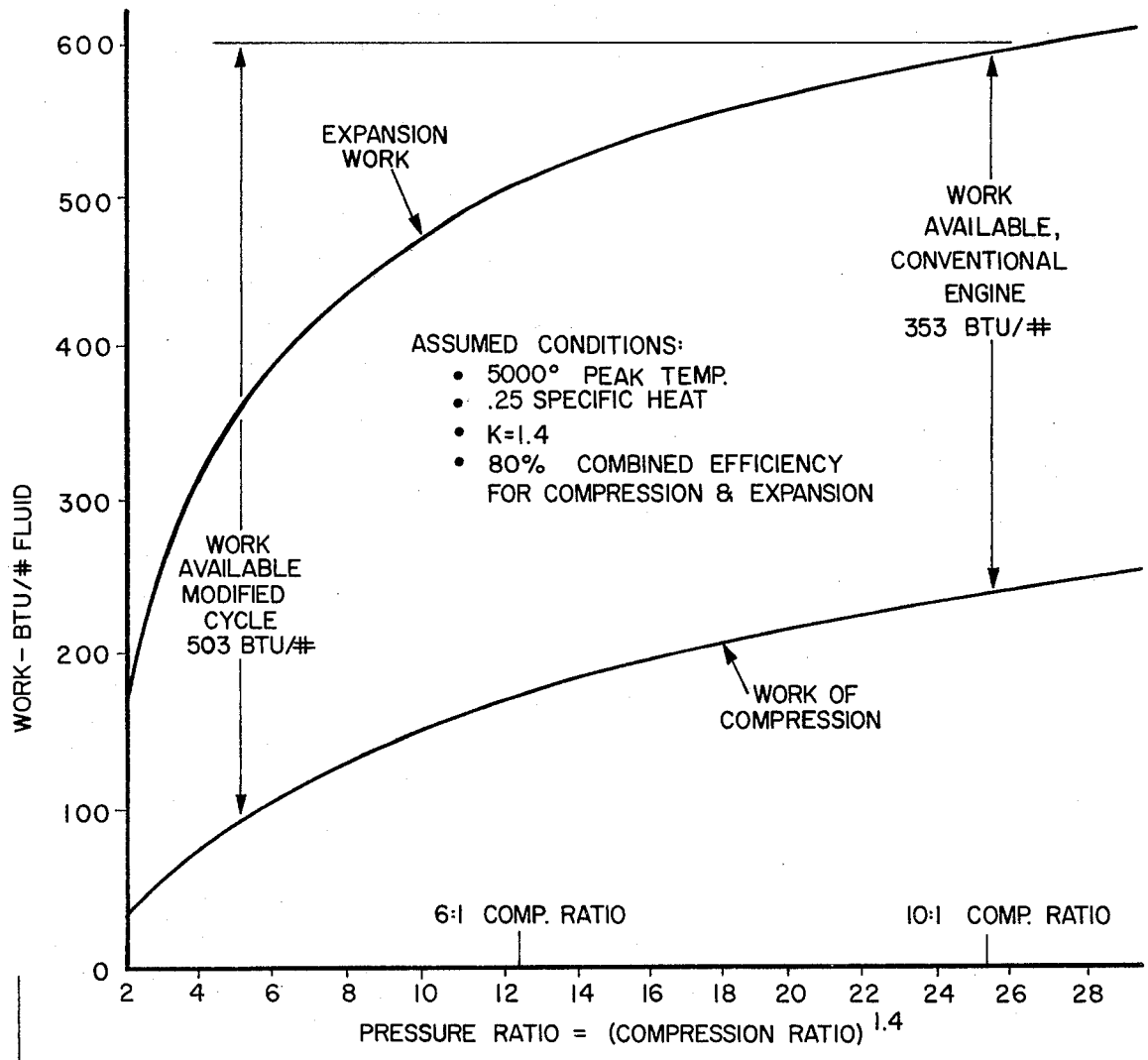
FIG. 9 is a graph illustrating the additional work available from the cycle carried out by the engine of the present invention.

In real combustion processes and real engines, the pressure change is equal to 3.5 to 5 times the pressure at the end of compression. Thus, for pressure of 100 psi at the end of compression, a pressure of 350 to 500 psi will be available at the end of combustion. Then, for example, for a volumetric compression ratio of 5 to 1, a volumetric expansion ratio of over 10 to 1 can be achieved without expanding to a pressure below atmospheric at the end of the expansion process. Conventional reciprocating engines cannot achieve the relationships above but such relationships can be accommodated in the engine of the present invention. FIG. 8 illustrates the P-V diagram showing the thermodynamic cycle of the engine of the present invention. FIG. 9 illustrates the additional work of expansion available from modified cycle carried out by the engine of the present invention.

From the curve shown in FIG. 9, it can be seen that if the pressure ratio is 25 (volumetric ratio approximately 10 to 1), the net work for an Otto cycle engine with equal compression and expansion ratios (volumetric) is 353 BTU per pound working fluid. However, if the compression ratio (volumetric ratio is 3 to 1) is matched to the 25 to 1 expansion pressure ratio, the net work increase to 503 BTU's per pound working fluid which amounts to approximately 40% increase in efficiency using the cold air standard.

THEORETICAL PERFORMANCE COMPARISON

A naturally aspirated combined cycle four cycle diesel having a 16:1 compression ratio and operating approximately on the Otto cycle compared with an engine of the present invention operating at 7:1 compression ratio and 16:1 expansion ratio.

Assumptions and Conditions

Hot Air Standard (Variable specific heat)
Volumetric efficiency 100%
T inlet = 600° R. (start of compression) = $T_1$
T end of combustion = 5000° R. = $T_3$
k avg. at temp. above 2000° R. = 1.3
$C_p$ at temp. below 1000° R. = 0.24
$C_p$ at temp. avg. 3000° R. (expansion) = 0.295
Adiabatic compression and expansion efficiency = 85%

$$\frac{k-1}{k} = .231$$

for k = 1.3
Cv at 3000° R. avg. temperature = 0.225
For the Diesel:
Press ratio for $(V_1/V_2) = 16$ $(16)^{1.3} = 36.9$

Compression $\Delta T_i$ comp = $T_1[(36.9)^{0.231} - 1] = 600[2.3 - 1] = 780°$ (ideal)
$\Delta T_{act} = \Delta T_1/0.85 = 780/0.85 = 918°$ actual So $T_2 = 918 + 600 = 1518°$ R.
Work of comp = (918) (0.24) = 220 BTU/# throughflow

Expansion $\Delta T_i = T_3[1 - (1/36.9)^{0.231}] = 5000$ $[1 - 0.438] = 2810$ ideal
$\Delta T_{actual} = (\Delta T_1)(0.85) = 2385$
Work of expansion = (2385) (0.295) = 705 BTU/#

Net Work of diesel = work of expansion − work of comp.
= 705 − 220 = 485 BYU/# throughflow For the modified cycle of the engine of the present invention as shown in FIG. 8 having a 7:1 compression ratio and a pressure ratio $(7)^{1.3} = 12.55$ $\Delta T_1 = 600[(12.55)^{0.231} - 1] = 600 [1.795 - 1] = 477$ ideal $\Delta T_{act} = 477/0.85 = 561$ and $T_2 = 1161°$ R.

For expansion work is the same as for the diesel (same expansion ratio and temperature).

Therefore the net work for the modified cycle is 705 − 135 = 570 BTU/# throughflow.

Theoretical Fuel Added

Since both cycles have constant volume combustion the heat added is WCv $\Delta T$ where $\Delta T = T_3 - T_2$.

For the diesel $\Delta T = 5000 - 1518 = 3482$ and heat added to reach 5000° R is 0.225(3482) = 784 BTU/#.

For the modified cycle $\Delta T = 5000 - 1161 = 3839$ and heat added is (3839) (0.225) = 863 BTU/#.

Efficiency of the diesel is:

$$\frac{\text{network}}{Q_A} = \frac{485}{78+} = 62\%$$

Efficiency of the combined cycle is $$\frac{570}{863} = 66\%$$

The above efficiencies are fictitious being a comparison of the two cycles using the same assumptions 5000° R is in fact, more nearly the temperature to be expected from a chemically correct fuel/air mixture when the effects of disassociation, quenching, combustion efficiency and the like are considered. The factors will vary with different fuels, engine speed, combustion chamber shape and other mechanical characteristics of the engine. Using average higher heating values of diesel fuel and gasoline and recalculating for chemically correct mixtures, the efficiencies will more nearly be:

Diesel 39.4%
Modified Cycle 44.5%

The above comparison is at full load conditions. At part load conditions the superiority of the modified cycle would be more pronounced because the higher compression work of the diesel rapidly eats into the lower gross work produced in the expansion cycle at lower temperatures and fuel flows. If the two engines are compared at a $T_3$ (end of combustion) of (3000° R using the same assumption the results would be:

Cp@2000° R avg. temp. = 0.28
Work of expansion diesel = 400 BTU/#
Work of expansion modified cycle = 400 BTU/#
Network diesel = 400 − 220 = 180 BTU/#
Network Modified = 400 − 135 = 265 BTU/#

Characteristically Otto and diesel engines are rated at full load and operated at part load. The importance of part load efficiency can be readily seen from a comparison of diesel powered autos as compared to Otto powered and the difference in fuel economy under the same rating conditions such as, for example, are used in E.P.A. standards. The advantage enjoyed by the diesel is largely the difference between the pumping losses in the Otto cycle and pumping losses in the unthrottled diesel cycle. The modified cycle offers the advantage of no pumping losses (except for a 1 to 2% power loss to drive the scavenge blower) as well as a reduction in compression work which becomes a significant part of the gross work available at part load.

The foregoing engine provides significant advantages. As demonstrated the efficiency of the present invention is significantly improved over conventional reciprocating Otto cycle engine. The engine of the present invention is extremely simple and can be fabricated at minimum expense eliminating complex valving, dynamic balancing and other problems. Speed changes can be controlled by simple varying fuel flows and accordingly objectionable emission should be reduced in normal power operating ranges due to high excess air maintained in the cycle.

It will be obvious to those skilled in the art to make various changes, alterations and modification to the foregoing invention without departing from the spirit and scope of the appended claims. For example, it is within the scope of the invention to modify the engine to operate as a compressor using an appropriate prime mover.

What is claimed is:

1. A rotary vane internal combustion device comprising:
   (a) a housing defining a cylindrical bore;
   (b) a fixed shaft extending in said bore having a first section having its axial center line concentric with the center line of the cylindrical bore and having a second section radially offset from the axial center line of said bore;
   (c) collar means rotative about said first shaft section within said bore;
   (d) a rotor mounted for rotation in said bore about an axis eccentric with respect to the longitudinal center line of said cylindrical bore;
   (e) power take-off means connected to said rotor concentric with said offset second shaft section;
   (f) a plurality of vanes hingedly secured to said collar means rotative with said rotor about a rotational axis coaxial with the longitudinal center line of said bore;
   (g) at least one vane fixedly secured to said collar means rotative with said rotor, said vanes, casing and rotor defining circumferential working chambers varying in volume as the rotor and vanes rotate from a maximum volume at approximately BCD to a minimum volume at approximately TDC and then increasing to a maximum at approximately BDC in the rotative cycle, TDC and BDC being approximately 180° spaced apart in the cycle;
   (h) intake and exhaust ports communicating with said chambers, said intake ports communicating with said working chambers substantially between BDC and TDC and said exhaust ports communicating with said working chambers substantially between TDC and BDC;
   (i) control means including fuel delivery means located to directly deliver fuel intermediate the intake port and TDC to form a combustible A/F mixture in a chamber while maintaining a constant throughflow; and
   (j) ignition means for igniting the combustible A/F mixture at approximately TDC whereby the theoretical thermodynamic cycle of operation is characterized by isentropic compression, constant volume combustion, isentropic expansion and constant pressure exhaust.

2. A rotary internal combustion engine comprising:
   (a) housing means defining a generally cylindrical working chamber;
   (b) rotor means eccentrically mounted with respect to said working chamber having output shaft means connected thereto, said output shaft being generally concentric with respect to said chamber, said rotor defining a plurality of axially extending vane slots;
   (c) a fixed shaft extending into said working chamber concentric with respect to said working chamber;
   (d) collar means rotatable about said fixed shaft;
   (e) at least one first vane secured to said collar means, said vane extending through one of said plurality of vane slots into close proximity with said working chamber;
   (f) a plurality of second vanes hingedly affixed to said collar and extending through said vane slots into close proximity with said working chamber, said first and second vanes, rotor and working chamber defining a plurality of pressure chambers having a maximum volume at approximately bottom dead center to approximately minimum volume at approximately top dead center, bottom and top dead center being displaced approximately 180°; with compression and expansion occurring in said chambers as said rotor and vanes rotate.
   (g) inlet means extending approximately 90° from bottom dead center toward top dead center for admission of explosive mixture into said pressure chamber;
   (h) exhaust means located at approximately bottom dead center and communicating with said pressure chambers; and
   (i) ignition means located and communicating with said working chambers at approximately top dead center whereby said explosive mixture is compressed ignited and expanded imparting rotational displacement to said vanes and rotor means and whereby the compression ratio is substantially less than the expansion ratio.

3. The rotary internal engine of claim 2 further including scavenge means communicating with said pressure chambers in the area extending approximately from bottom dead center to approximately 90° toward top dead center in the compression region.

4. The rotary engine of claim 2 further including means for adjusting the relationship of the expansion ratio to the compression ratio.

5. The rotary engine of claim 2 further including check valve means communicating with the pressure chambers in the expansion region adjacent bottom dead center to permit inflow to said chamber in the event expansion to a negative pressure occurs in this region.

6. The internal combustion engine of claim 2 further including seal means in the opposed edges at said vane slots.

* * * * *

UNITED STATES PATENT AND TRADEMARK OFFICE
CERTIFICATE OF CORRECTION

PATENT NO. : 4,241,713
DATED : December 30, 1980
INVENTOR(S) : Melvin R. Crutchfield It is certified that error appears in the above-identified patent and that said Letters Patent are hereby corrected as shown below:

The spelling of the inventor's name should be corrected as follows:

--MALVERN R. CRUTCHFIELD--

Signed and Sealed this

Twenty-fourth Day of March 1981

[SEAL]

Attest:

RENE D. TEGTMEYER

*Attesting Officer*   *Acting Commissioner of Patents and Trademarks*